(12) United States Patent
Ho

(10) Patent No.: US 9,250,801 B2
(45) Date of Patent: Feb. 2, 2016

(54) UNLOCKING METHOD, PORTABLE ELECTRONIC DEVICE AND TOUCH-SENSITIVE DEVICE

(75) Inventor: Wen-Ching Ho, Taoyuan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 196 days.

(21) Appl. No.: 13/596,074

(22) Filed: Aug. 28, 2012

(65) Prior Publication Data

US 2013/0135226 A1    May 30, 2013

Related U.S. Application Data

(60) Provisional application No. 61/564,871, filed on Nov. 30, 2011.

(30) Foreign Application Priority Data

May 28, 2012    (TW) .............................. 101118961 A

(51) Int. Cl.
  *G06F 3/041*    (2006.01)
  *G06F 3/0488*    (2013.01)
(52) U.S. Cl.
  CPC ................................ *G06F 3/04883* (2013.01)
(58) Field of Classification Search
  CPC ................................ G06F 3/048; G06F 21/36
  See application file for complete search history.

(56) References Cited

U.S. PATENT DOCUMENTS

| 7,657,849 B2 | 2/2010 | Chaudhri et al. |
| 2005/0253817 A1 | 11/2005 | Rytivaara et al. |
| 2009/0083850 A1* | 3/2009 | Fadell et al. ..................... 726/19 |
| 2009/0217212 A1* | 8/2009 | Madar et al. ................... 715/867 |
| 2010/0087230 A1* | 4/2010 | Peh et al. ....................... 455/566 |
| 2011/0166916 A1* | 7/2011 | Inbar ............................. 705/14.4 |
| 2012/0252410 A1* | 10/2012 | Williams ....................... 455/411 |

FOREIGN PATENT DOCUMENTS

| CN | 101408832 | 4/2009 |
| CN | 101430597 | 5/2009 |
| CN | 101986251 | 3/2011 |

(Continued)

OTHER PUBLICATIONS

"Office Action of Taiwan Counterpart Application," issued on Jan. 23, 2015, p. 1-p. 14.

(Continued)

*Primary Examiner* — Kathy Wang-Hurst
*Assistant Examiner* — Peijie Shen
(74) *Attorney, Agent, or Firm* — Jianq Chyun IP Office

(57) ABSTRACT

An unlocking method for a portable electronic device, and a portable electronic device and a touch-sensitive device employing the unlocking method are provided. The portable electronic device has a touch-sensitive display, and a user interface is displayed on the touch-sensitive display. The unlocking method includes respectively displaying at least one unlocking image on at least one unfixed point of the touch-sensitive display when the user interface is in a user interface locking state and sensing a touch signal of the touch-sensitive display. The unlocking method further includes switching the user interface to a user interface unlocking state when at least one click corresponding to the at least one unfixed point is detected on the touch-sensitive display.

14 Claims, 15 Drawing Sheets

(56) References Cited

FOREIGN PATENT DOCUMENTS

| CN | 102103465 | 6/2011 |
|---|---|---|
| CN | 102147691 | 8/2011 |
| TW | 201137658 | 11/2011 |

OTHER PUBLICATIONS

"Office Action of China Counterpart Application", issued on Feb. 27, 2015, p. 1-p. 16.

* cited by examiner

UNLOCKING METHOD, PORTABLE ELECTRONIC DEVICE AND TOUCH-SENSITIVE DEVICE

CROSS-REFERENCE TO RELATED APPLICATION

This application claims the priority benefits of U.S. provisional application Ser. No. 61/564,871, filed on Nov. 30, 2011. In addition, this application claims the priority benefit of Taiwan application serial no. 101118961, filed on May 28, 2012. The entirety of each of the above-mentioned patent applications is hereby incorporated by reference herein and made a part of this specification.

BACKGROUND

1. Technique Field

The disclosure generally relates to a user interface of a touch-sensitive display, and more particularly, to a portable electronic device, an unlocking method of a user interface thereof, and a touch-sensitive device.

2. Description of Related Art

Along with the fast advancement and broad application of the information technology, wireless communication, and information appliances, touch-sensitive displays have replaced the conventional keyboards and mouses as the input devices of many information products. A touch-sensitive display can be used as both the input interface and the output interface of a product. A user can not only view operation images through a touch-sensitive display but also input texts or commands through the touch-sensitive display to operate an information product.

In order to prevent an electronic device from mistakenly receiving any unexpected operation instruction (for example, the user accidentally touches a key and accordingly triggers a misoperation), the operation interface of the electronic device is usually locked when the user does not continue to operate the electronic device. When the electronic device receives an unlocking instruction, the functionality of the operation interface is re-activated and the user is allowed to issue operation instructions through the operation interface displayed on the touch-sensitive display. Conventionally, when the operation interface is locked, the user needs to press down a physical key combination or input a password to unlock the operation interface. However, in most cases, pressing multiple physical keys to unlock an operation interface is not very convenient. Besides, the disposition of physical keys on a touch-sensitive electronic device does not meet the design concept of touch-sensitive information products. On the other hand, it is time-consuming to unlock an operation interface by inputting a password. Thereby, an unlocking mechanism needs to be developed for touch-sensitive electronic devices.

SUMMARY OF THE DISCLOSURE

Accordingly, the disclosure is directed to an unlocking method, a portable electronic device, and a touch-sensitive device, in which a user interface is effectively unlocked.

According to an exemplary embodiment of the present disclosure, an unlocking method for a portable electronic device is provided. The portable electronic device has a touch-sensitive display, and a user interface is displayed on the touch-sensitive display. The unlocking method includes, when the user interface is in a user interface locking state, respectively displaying at least one unlocking image on at least one unfixed point of the touch-sensitive display; sensing a touch signal of the touch-sensitive display; and switching the user interface to a user interface unlocking state when at least one click respectively corresponding to the at least one unfixed point is detected on the touch-sensitive display user interface.

According to an exemplary embodiment of the disclosure, the unlocking method further includes generating the coordinates of the at least one unfixed point when the user interface is switched to the user interface locking state.

According to an exemplary embodiment of the disclosure, the number of the at least one unfixed point is a fixed number, and the fixed number is 1.

According to an exemplary embodiment of the disclosure, the at least one click is a multiple-click or a long-click.

According to an exemplary embodiment of the disclosure, the number of the at least one unfixed point is a fixed number, and the fixed number is greater than 1.

According to an exemplary embodiment of the disclosure, each one of the at least one click is a single click, a multiple-click, or a long-click.

According to an exemplary embodiment of the disclosure, the number of the at least one unfixed point is an unfixed number.

According to an exemplary embodiment of the disclosure, when the number of the at least one unfixed point is greater than 1, the step of respectively displaying the at least one unlocking image on the at least one unfixed point of the touch-sensitive display includes respectively and simultaneously displaying the at least one unlocking image on the at least one unfixed point.

According to an exemplary embodiment of the disclosure, when the number of the at least one unfixed point is greater than 1, the step of switching the user interface to the user interface unlocking state when the at least one click respectively corresponding to the at least one unfixed point is detected on the touch-sensitive display includes switching the user interface to the user interface unlocking state when the at least one click respectively corresponding to the at least one unfixed point is simultaneously detected on the touch-sensitive display.

According to an exemplary embodiment of the disclosure, when the number of the at least one unfixed point is greater than 1, the step of switching the user interface to the user interface unlocking state when the at least one click respectively corresponding to the at least one unfixed point is detected on the touch-sensitive display includes switching the user interface to the user interface unlocking state when the at least one click respectively corresponding to the at least one unfixed point is sequentially detected on the touch-sensitive display.

According to an exemplary embodiment of the disclosure, when the number of the at least one unfixed point is greater than 1, the step of respectively displaying the at least one unlocking image on the at least one unfixed point of the touch-sensitive display includes respectively and sequentially displaying the at least one unlocking image on the at least one unfixed point.

According to an exemplary embodiment of the disclosure, when the number of the at least one unfixed point is greater than 1, the step of switching the user interface to the user interface unlocking state when the at least one click respectively corresponding to the at least one unfixed point is detected on the touch-sensitive display includes switching the user interface to the user interface unlocking state when the at least one click respectively corresponding to the at least one unfixed point is sequentially detected on the touch-sensitive display.

According to an exemplary embodiment of the disclosure, when the number of the at least one unfixed point is greater than 1, the at least one unlocking image is different from each other.

According to an exemplary embodiment of the disclosure, the at least one unfixed point is corresponding to at least one coordinate, and each of the at least one coordinate is randomly generated.

According to an exemplary embodiment of the disclosure, the at least one unfixed point is corresponding to at least one coordinate, and each of the at least one coordinate is generated according to a predetermined rule.

According to an exemplary embodiment of the present disclosure, a touch-sensitive device including a user interface controlling unit, a display driving unit, and a sensing unit is provided. The user interface controlling unit is configured to control a user interface. The display driving unit is configured to drive a touch-sensitive display to respectively display at least one unlocking image on at least one unfixed point when the user interface is in a user interface locking state. The sensing unit is configured to sense a touch signal of the touch-sensitive display, wherein when the sensing unit detects at least one click respectively corresponding to the at least one unfixed point on the touch-sensitive display, the user interface controlling unit switches the user interface to a user interface unlocking state.

According to an exemplary embodiment of the present disclosure, a portable electronic device including a touch-sensitive display and a touch-sensitive device is provided. The touch-sensitive display is configured to display a user interface. The touch-sensitive device is configured to control the user interface and drives the touch-sensitive display to respectively display at least one unlocking image on at least one unfixed point when the user interface is in a user interface locking state. The touch-sensitive device is also configured to sense a touch signal of the touch-sensitive display. When the touch-sensitive device detects at least one click respectively corresponding to the at least one unfixed point on the touch-sensitive display, the touch-sensitive device switches the user interface to a user interface unlocking state.

According to an exemplary embodiment of the present disclosure, an unlocking method for a portable electronic device is provided. The portable electronic device has a touch-sensitive display, and a user interface is displayed on the touch-sensitive display. The unlocking method includes respectively displaying a plurality of unlocking images at a plurality of fixed positions on the touch-sensitive display when the user interface is in a user interface locking state. The unlocking method also includes sensing a touch signal of the touch-sensitive display and when a plurality of clicks respectively corresponding to the fixed positions is detected on the touch-sensitive display, switching the user interface to a user interface unlocking state.

According to an exemplary embodiment of the disclosure, the unlocking method further includes obtaining the coordinates of the fixed positions when the user interface is switched to the user interface locking state.

According to an exemplary embodiment of the disclosure, the number of the fixed positions is a fixed number.

According to an exemplary embodiment of the disclosure, the number of the fixed positions is an unfixed number.

According to an exemplary embodiment of the disclosure, the step of respectively displaying the unlocking images at the fixed positions on the touch-sensitive display includes respectively and simultaneously displaying the unlocking images at the fixed positions.

According to an exemplary embodiment of the disclosure, the step of switching the user interface to the user interface unlocking state when the clicks respectively corresponding to the fixed positions are detected on the touch-sensitive display includes switching the user interface to the user interface unlocking state when the clicks respectively corresponding to the fixed positions are simultaneously detected on the touch-sensitive display.

According to an exemplary embodiment of the disclosure, the step of switching the user interface to the user interface unlocking state when the clicks respectively corresponding to the fixed positions are detected on the touch-sensitive display includes switching the user interface to the user interface unlocking state when the clicks respectively corresponding to the fixed positions are sequentially detected on the touch-sensitive display.

According to an exemplary embodiment of the disclosure, the step of respectively displaying the unlocking images at the fixed positions on the touch-sensitive display includes sequentially and respectively displaying the unlocking images at the fixed positions.

According to an exemplary embodiment of the present disclosure, a touch-sensitive device including a user interface controlling unit, a display driving unit, and a sensing unit is provided. The user interface controlling unit is configured to control a user interface. The display driving unit is configured to drive a touch-sensitive display to respectively display a plurality of unlocking images at a plurality of fixed positions when the user interface is in a user interface locking state. The sensing unit is configured to sense a touch signal of the touch-sensitive display. When the sensing unit detects a plurality of clicks respectively corresponding to the fixed positions on the touch-sensitive display, the user interface controlling unit switches the user interface to a user interface unlocking state.

According to an exemplary embodiment of the present disclosure, a portable electronic device including a touch-sensitive display and a touch-sensitive device is provided. The touch-sensitive display is configured to display a user interface. The touch-sensitive device is configured to control the user interface and when the user interface is in a user interface locking state, drive the touch-sensitive display to respectively display a plurality of unlocking images at a plurality of fixed positions. The touch-sensitive device is configured to sense a touch signal of the touch-sensitive display, wherein when the touch-sensitive device detects a plurality of clicks respectively corresponding to the fixed positions on the touch-sensitive display, the touch-sensitive device switches the user interface to a user interface unlocking state.

As described above, the unlocking method, the portable electronic device, and the touch-sensitive device in the exemplary embodiments can effectively unlock a user interface.

These and other exemplary embodiments, features, aspects, and advantages of the disclosure will be described and become more apparent from the detailed description of exemplary embodiments when read in conjunction with accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
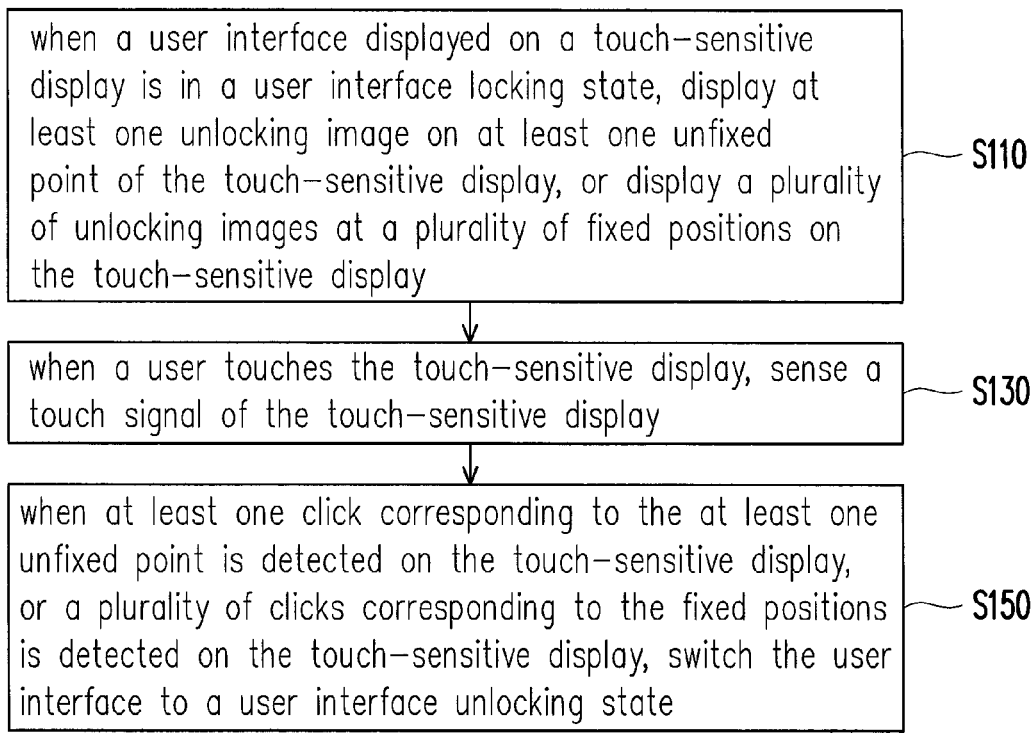
FIG. 1 is a flowchart of an unlocking method according to the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a flowchart of an unlocking method according to an embodiment of the disclosure. Referring to FIG. 1, when a user interface displayed on a touch-sensitive display is in a user interface locking state, at least one unlocking image is displayed on at least one unfixed point of the touch-sensitive display, or a plurality of unlocking images is displayed at a plurality of fixed positions on the touch-sensitive display (step S110). Subsequently, when a user touches the touch-sensitive display, a touch signal of the touch-sensitive display is sensed (step S130). Besides, when at least one click corresponding to the at least one unfixed point is detected on the touch-sensitive display, or a plurality of clicks corresponding to the fixed positions is detected on the touch-sensitive display, the user interface is switched to a user interface unlocking state (step S150). Thereby, through the unlocking method provided by the disclosure, the user can quickly unlock the user interface by clicking the touch-sensitive display.

The unlocking method provided by the disclosure, a portable electronic device using the same, and a touch-sensitive device of the portable electronic device will be described in detail with reference to several exemplary embodiments.

First Exemplary Embodiment

Figure 2:
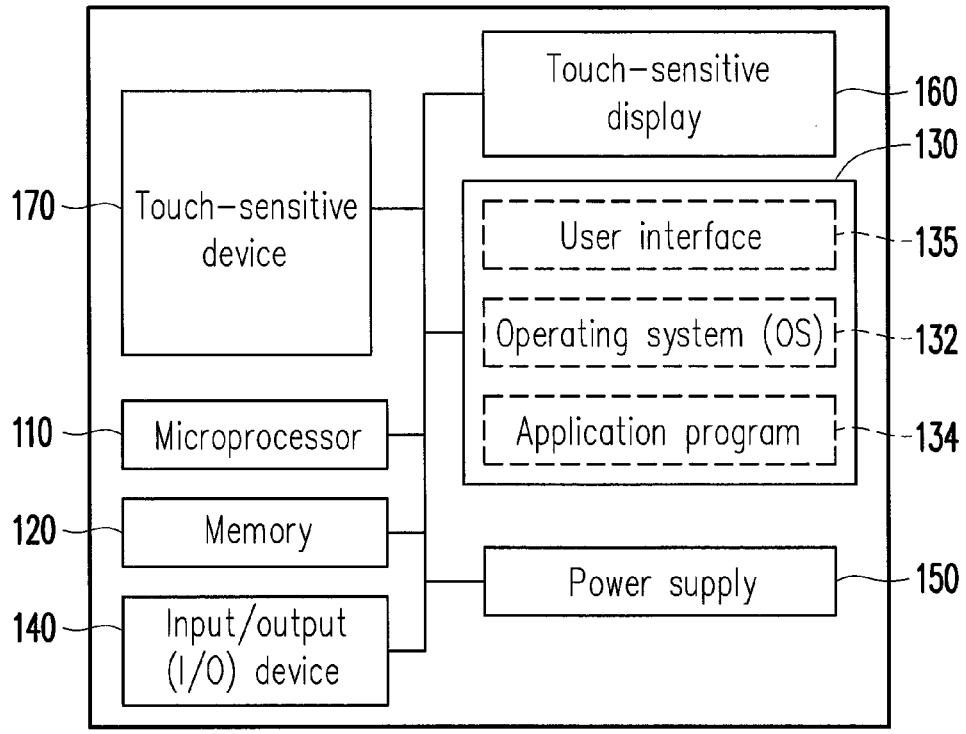
FIG. 2 is schematic block diagram of a portable electronic device according to a first exemplary embodiment.

FIG. 2 is schematic block diagram of a portable electronic device according to the first exemplary embodiment.

Referring to FIG. 2, the portable electronic device 100 includes a touch-sensitive display 160 and a touch-sensitive device 170. Besides, the portable electronic device 100 may further include at least one of a microprocessor 110, a memory 120, a storage device 130, an input/output (I/O) device 140, and a power supply 150. The portable electronic device 100 may be a cell phone, a personal digital assistant (PDA), a smart phone, an e-book, a game console, or a tablet PC. However, the type of the portable electronic device 100 is not limited herein. It should be noted that in the present exemplary embodiment, the portable electronic device 100 may further include other devices or units, and the disclosure is not limited herein.

The microprocessor 110 is configured to control the overall operation of the portable electronic device 100. In the present exemplary embodiment, the microprocessor 110 may be a micro-controller, an embedded controller, or a central processing unit (CPU). However, the type of the microprocessor 110 is not limited in the disclosure.

The memory 120 is configured to temporarily store data. In the present exemplary embodiment, the memory 120 may be a read only memory (ROM), a dynamic random access memory (DRAM), or a static random access memory (SRAM). However, the type of the memory 120 is not limited in the disclosure.

The storage device 130 is configured to install programs and store user data. The storage device 130 may be a magnetic storage medium or a non-volatile memory module. However, the type of the storage device 130 is not limited in the disclosure. In the present exemplary embodiment, an operating system (OS) 132, an application program 134, and a user interface 135 are installed in the storage device 130. Generally, during the operation of the portable electronic device 100, the microprocessor 110 loads the OS 132, the application program 134, and the user interface 135 into the memory 120 to execute the same.

The OS 132 may be Microsoft Windows, Mac OS X, Unix, Android, iOS, or any other operating system. However, the type of the OS 132 is not limited in the disclosure. In addition, the application program 134 may be a game program, an instant messaging program, or a browser.

The user interface 135 is configured to provide a visual operation and management interface to a user. For example, the user may issue operation instructions to the portable electronic device 100 by touching icons in the user interface 135 displayed on the touch-sensitive display 160. In the present exemplary embodiment, the user interface 135 is in a user interface unlocking state or a user interface locking state according to the user's setting. To be specific, when the user interface 135 is in the user interface unlocking state, the portable electronic device 100 responds to operations performed by the user on the touch-sensitive display 160, while when the user interface 135 is in the user interface locking state, the portable electronic device 100 does not respond to any operation performed by the user on the touch-sensitive display 160 except several predetermined operations (for example, receiving incoming calls).

However, it should be noted that the state of the user interface 135 is not limited in the disclosure, and besides aforementioned user interface unlocking state and user interface locking state, the user interface 135 may also be set to other states. For example, in another exemplary embodiment, the user interface 135 may also be in a standby state or a sleep state. When the user interface 135 is in the standby state, the portable electronic device 100 is in a low power consumption state (only supplies power to the memory 120) and waits for an operation instruction issued by the user to resume its original state before it enters the standby state. When the user interface 135 is in the sleep state, the portable electronic device 100 enters a powerless state and waits for a wake-up instruction issued by the user to resume its original state before it enters the sleep state.

The I/O device 140 may be any signal I/O device, such as a button, a mouse, an earphone, a microphone, or a speaker. The power supply 150 is configured to supply power required by the operation of the portable electronic device 100. The power supply 150 may be a battery or another type of power source.

The touch-sensitive display 160 is configured to display the user interface 135. To be specific, a user can issue operation instructions to the portable electronic device 100 by touching the user interface 135 displayed on the touch-sensitive display 160. The user may input texts or commands through the user interface 135 by clicking at or sliding on the touch-sensitive display 160 with a stylus or a finger. In the present exemplary embodiment, the touch-sensitive display 160 may be a resistive touch panel, a capacitive touch panel, an optical touch panel, an acoustic wave touch panel, or an electromagnetic touch panel. However, the type of the touch-sensitive display 160 is not limited in the disclosure.

The touch-sensitive device 170 is configured to sense a touch signal generated by the user on the touch-sensitive display 160. Particularly, in the present exemplary embodiment, the touch-sensitive device 170 drives the touch-sensitive display 160 to display an unlocking image on an unfixed point and senses the touch signal of the touch-sensitive display 160 when the user interface 135 is in the user interface locking state. Besides, when the touch-sensitive device 170 detects a click corresponding to the unfixed point on the touch-sensitive display 160, it switches the user interface 135 to the user interface unlocking state.

In the present exemplary embodiment, an unfixed point means that an unlocking image is not always displayed at a fixed position on the touch-sensitive display 160 in different unlocking operations but is displayed at different positions. In an example, every time when an unlocking image is to be displayed on the touch-sensitive display 160, the touch-sensitive device 170 may generate a random number as corresponding coordinates according to the display range of the touch-sensitive display 160 and drives the touch-sensitive display 160 to display the unlocking image at this coordinates.

It should be mentioned that serving a random number as the coordinates for displaying an unlocking image is only an example and the disclosure is not limited thereto. In another exemplary embodiment, the touch-sensitive device 170 may also generate the coordinates of the unfixed point according to a predetermined rule. For example, the touch-sensitive device 170 divides the touch-sensitive display 160 into 9 blocks, wherein each block has central point coordinates, and stores the 9 central point coordinates into the storage device 130. Every time when the user interface 135 is switched to the user interface locking state, the touch-sensitive device 170 uses each one of these central point coordinates as the coordinates of the unfixed point in a predetermined order.

Figure 3:
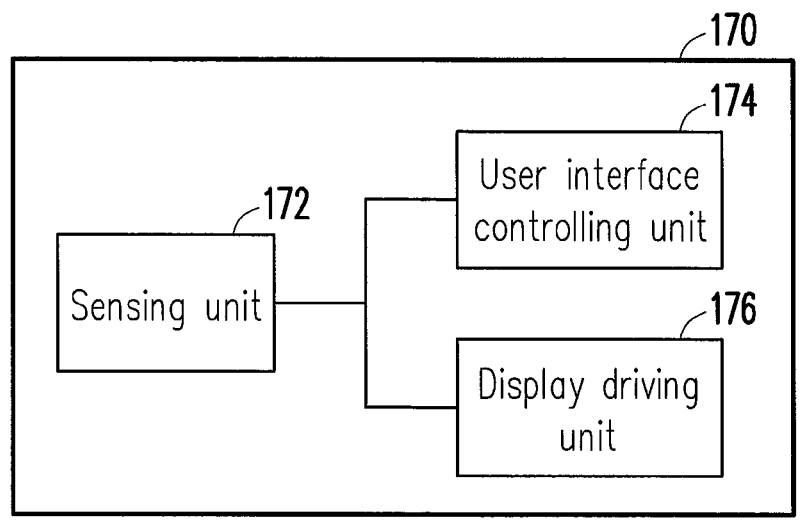
FIG. 3 is a schematic block diagram of a touch-sensitive device according to the first exemplary embodiment.

FIG. 3 is a schematic block diagram of a touch-sensitive device according to the first exemplary embodiment. It should be understood that the touch-sensitive device illustrated in FIG. 3 is only an example but not intended to limit the scope of the disclosure.

Referring to FIG. 3, the touch-sensitive device 170 includes a sensing unit 172, a user interface controlling unit 174, and a display driving unit 176.

The sensing unit 172 is configured to sense a touch signal of the touch-sensitive display 160. The type of the sensing unit 172 is corresponding to the type of the touch-sensitive display 160. Taking a capacitive touch-sensitive display 160 as an example, the sensing unit 172 is a current sensing device capable of detecting the coupling current on the touch-sensitive display 160. To be specific, when the user touches the touch-sensitive display 160, the touch-sensitive display 160 generates a coupling current in response to the touch action of the user. Herein the sensing unit 172 determines the touched position on the touch-sensitive display 160 according to the direction and position of the coupling current.

The user interface controlling unit 174 is configured to control the state of the user interface 135. For example, the user interface controlling unit 174 can switch the state of the user interface 135 to a user interface locking state or a user interface unlocking state. Or, in another exemplary embodiment, the user interface controlling unit 174 may also switch the state of the user interface 135 to a standby state or a sleep state. In the present exemplary embodiment, the user interface controlling unit 174 may be a control chip or a microcontroller. However, the type of the user interface controlling unit 174 is not limited in the disclosure.

In the present exemplary embodiment, every time after the user interface controlling unit 174 switches the state of the user interface 135, it records the state information of the user interface 135 so that the current state of the user interface 135 can be determined according to the state information. For example, the user interface controlling unit 174 records whether the current state of the user interface 135 is the user interface locking state, the user interface unlocking state, the standby state, or the sleep state by using a state machine.

The display driving unit 176 is configured to drive the touch-sensitive display 160 to display unlocking images. Particularly, in the present exemplary embodiment, when the user interface 135 is in the user interface locking state, the display driving unit 176 drives the touch-sensitive display 160 to display an unlocking image on an unfixed point according to the coordinates of the unfixed point. In the present exemplary embodiment, the display driving unit 176 may be a display chip or a display driving circuit. However, the type of the display driving unit 176 is not limited in the disclosure.

As described above, in the present exemplary embodiment, when the user interface 135 is in the user interface locking state and the sensing unit 172 detects a click corresponding to the unfixed point on the touch-sensitive display 160, the user interface controlling unit 174 switches the user interface 135 to the user interface unlocking state. Namely, when the user interface 135 is in the user interface locking state, the user sees the unlocking image displayed on the touch-sensitive display 160, and the state of the user interface 135 is switched to the user interface unlocking state after the user clicks the unlocking image.

It should be mentioned that the number of times and the frequency that the unlocking image displayed on the unfixed point is clicked may also be used as one of the conditions for determining whether an unlocking procedure is triggered. For example, in the present exemplary embodiment, when the sensing unit 172 detects a multiple-click corresponding to the unfixed point on the touch-sensitive display 160, the user interface controlling unit 174 switches the user interface 135 to the user interface unlocking state. However, in another exemplary embodiment, when the sensing unit 172 detects a single click or a long-click corresponding to the unfixed point on the touch-sensitive display 160, the user interface controlling unit 174 switches the user interface 135 to the user interface unlocking state. To be specific, a click can be identified as a single click, a multiple-click, or a long-click. A single click is to gently press or click the touch-sensitive display 160 once. A multiple-click is to click the same unlocking image multiple times (for example, click the same unlocking image 2 or 3 times within a specific number of seconds). A long-click is continuously pressing the touch-sensitive display 160 for a specific number of seconds. It should be mentioned that in some embodiments, the number of times and/or duration for clicking each unlocking image can be arranged as the system's default settings according to the actual design requirement. In some other embodiments, the number of times and/or duration for clicking each unlocking image may be unrestricted. In other words, a user can implement the click as a single click, a multiple-click (including the number of times or frequency of the clicks), or a long-click (including the pressing duration) according to the actual requirement.

Figure 4:
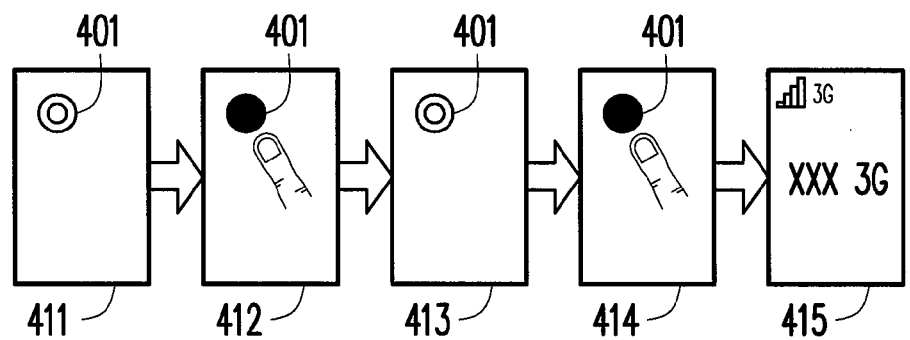
FIG. 4 and FIG. 5 are diagrams illustrating an example of how a user unlocks a user interface according to the first exemplary embodiment.
Figure 5:
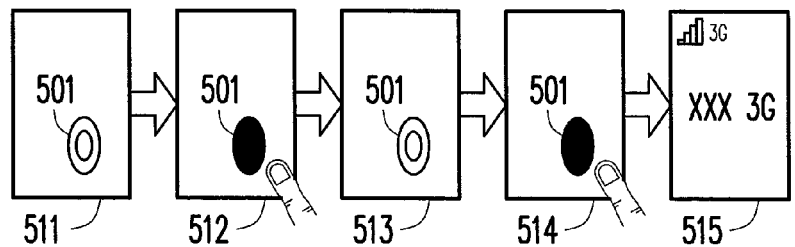

FIG. 4 and FIG. 5 are diagrams illustrating an example of how a user unlocks a user interface according to the first exemplary embodiment.

Referring to FIG. 4, when the user interface 135 is in the user interface locking state, the touch-sensitive device 170 drives the touch-sensitive display 160 to display an unlocking image 401 on an unfixed point (Screen 411). If the user is about to switch the user interface 135 to the user interface unlocking state, the user needs to click the unlocking image 401 twice (a multiple-click).

To be specific, after the user performs a single click on the unlocking image 401 for the first time (Screen 412), the unlocking image 401 guides the user to perform another single click (Screen 413). After the user performs a single click on the unlocking image 401 for the second time (Screen 414), the touch-sensitive device 170 (or the user interface controlling unit 174) switches the user interface 135 to the user interface unlocking state (Screen 415).

Referring to FIG. 5, when the unlocked user interface 135 (as shown in FIG. 4) is switched to the user interface locking state again, an unlocking image 501 appears on another unfixed point (Screen 511).

Similarly, after the user performs a single click on the unlocking image 501 for the first time (Screen 512), the unlocking image 501 guides the user to perform another single click (Screen 513). After the user performs a single click on the unlocking image 501 for the second time (Screen 514), the touch-sensitive device 170 switches the user interface 135 to the user interface unlocking state (Screen 515).

It should be mentioned that in the present exemplary embodiment, if the touched area exceeds a range having a predetermined radius (for example, a radius of 1 cm or 10% of the width of the touch-sensitive display 160) extended from the central coordinates of the current touch action, the current touch action is considered a slide or any other predefined action instead of a click mentioned in the present exemplary embodiment. For example, if the user's finger moves outwards from the initially touched position and exceeds a range having a predetermined radius at the same time when it touches an unlocking image, the current touch action is considered a slide, and accordingly no unlocking procedure is triggered, so that misoperation of the touch-sensitive device 170 is avoided.

As described above, in the present exemplary embodiment, a user can switch the state of the user interface 135 from the user interface locking state to the user interface unlocking state by clicking an unfixed point of the touch-sensitive display 160.

Figure 6:
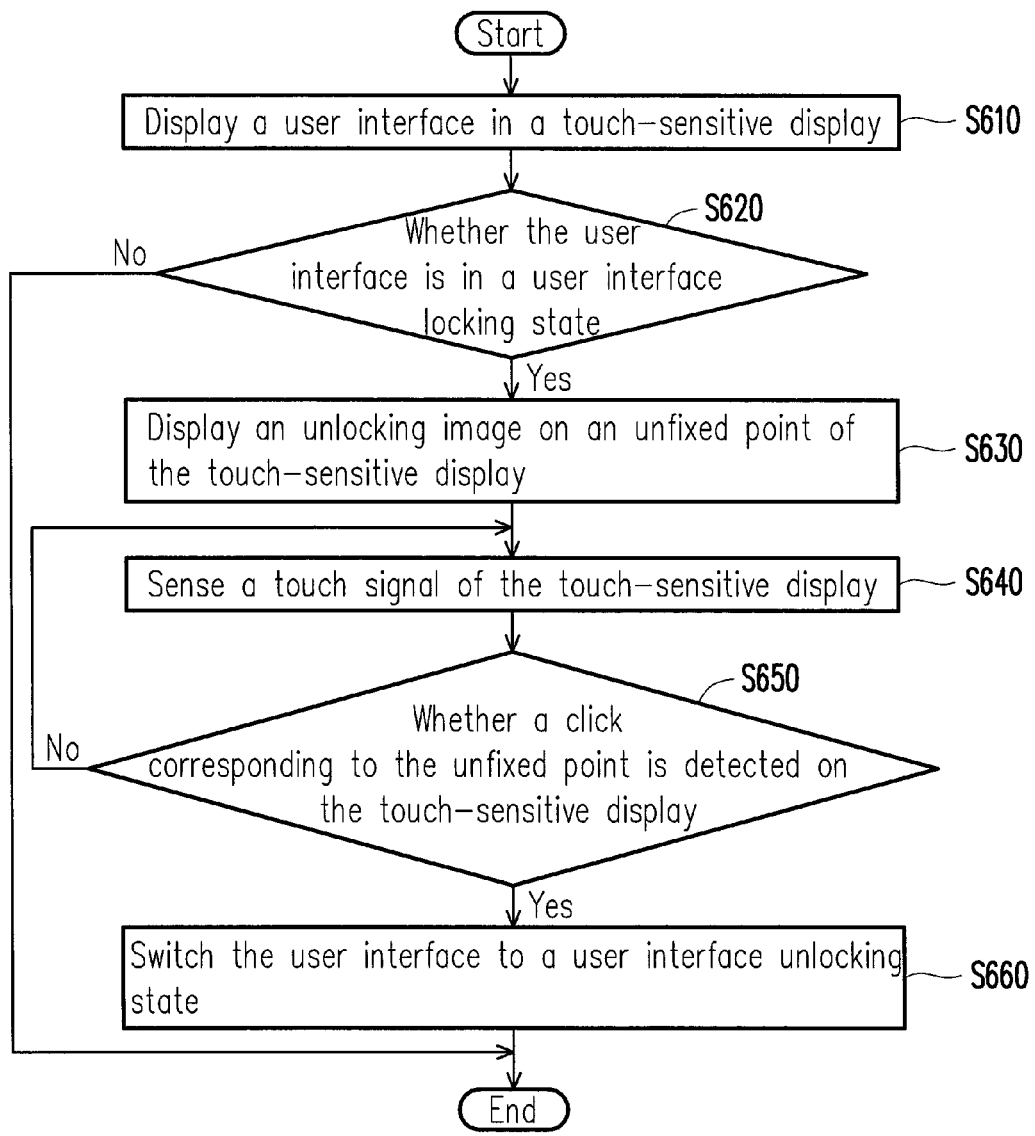
FIG. 6 is a flowchart of an unlocking method according to the first exemplary embodiment.

FIG. 6 is a flowchart of an unlocking method according to the first exemplary embodiment.

Referring to FIG. 6, in step S610, the touch-sensitive display 160 displays the user interface 135. In step S620, the touch-sensitive device 170 determines whether the user interface 135 is in the user interface locking state. For example, the user interface controlling unit 174 determines whether the user interface 135 is in the user interface locking state according to the previously recorded state information of the user interface 135. If the user interface 135 is not in the user interface locking state, the procedure illustrated in FIG. 6 is terminated.

If the user interface 135 is in the user interface locking state, in step S630, the touch-sensitive device 170 drives the touch-sensitive display 160 to display one unlocking image on an unfixed point. For example, the user interface controlling unit 174 randomly generates the coordinates of an unfixed point, and the display driving unit 176 drives the touch-sensitive display 160 to display one unlocking image on the coordinates of the unfixed point.

In step S640, the touch-sensitive device 170 senses a touch signal of the touch-sensitive display 160. In step S650, the touch-sensitive device 170 determines whether a click corresponding to the unfixed point is detected on the touch-sensitive display 160. When a click corresponding to the unfixed point is detected, in step S660, the touch-sensitive device 170 switches the user interface 135 to the user interface unlocking state. For example, the user interface controlling unit 174 switches the user interface 135 to the user interface unlocking state. If no click corresponding to the unfixed point is detected, Step S640 is executed.

Second Exemplary Embodiment

The hardware structure in the second exemplary embodiment is substantially the same as that in the first exemplary embodiment, and the difference is that in the second exemplary embodiment, unlocking images are simultaneously displayed on a plurality of unfixed points of the touch-sensitive display, and the user interface is only switched to the user interface unlocking state when clicks corresponding to the unfixed points are simultaneously detected. Below, the unlocking method in the second exemplary embodiment will be described by referring to the devices described in the first exemplary embodiment.

Figure 7:
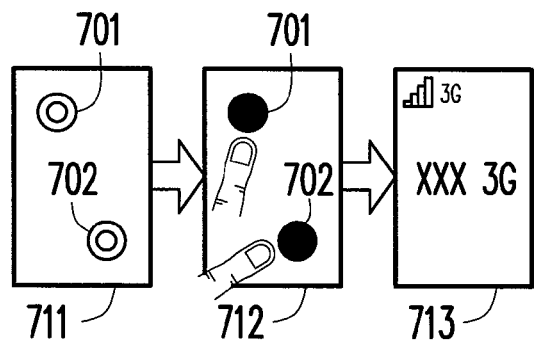
FIG. 7 and FIG. 8 are diagrams illustrating an example of how a user unlocks a user interface according to a second exemplary embodiment.
Figure 8:
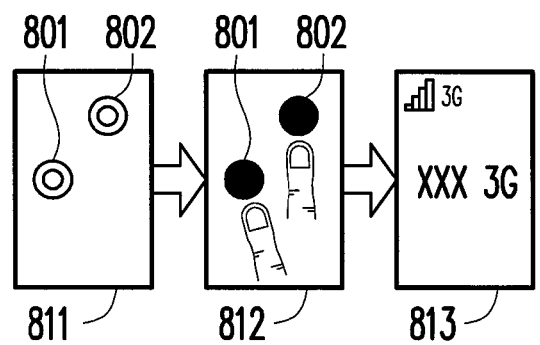

FIG. 7 and FIG. 8 are diagrams illustrating an example of how a user unlocks a user interface according to the second exemplary embodiment.

Referring to FIG. 7, when the user interface 135 is in the user interface locking state, the touch-sensitive device 170 drives the touch-sensitive display 160 to display unlocking images 701 and 702 on two randomly determined unfixed points (Screen 711). Herein if the user is about to switch the user interface 135 to the user interface unlocking state, the user needs to click the unlocking images 701 and 702 at substantially the same time.

For example, after the user respectively clicks the unlocking image 701 and 702 at the same time (Screen 712), the touch-sensitive device 170 (or the user interface controlling unit 174) switches the user interface 135 to the user interface unlocking state (Screen 713).

Referring to FIG. 8, when the user interface 135 is switched to the user interface locking state again, the touch-sensitive device 170 drives the touch-sensitive display 160 to display unlocking images 801 and 802 on two randomly determined unfixed points (Screen 811). Similarly, after the user clicks the unlocking images 801 and 802 at the same time (Screen 812), the touch-sensitive device 170 switches the user interface 135 to the user interface unlocking state (Screen 813).

In the present exemplary embodiment, the touch-sensitive device 170 generates the coordinates of a plurality of unfixed points as random numbers. However, the disclosure is not limited thereto. Taking the random generation of the coordinates of 3 unfixed points as an example, in another exemplary embodiment, the touch-sensitive device 170 randomly generates coordinates and serves the coordinates as the barycentric coordinates of a standard triangle. Then, the touch-sensitive device 170 generates 3 vertex coordinates of the standard triangle corresponding to the barycentric coordinates according to the barycentric coordinates and serves the 3 vertex coordinates as the coordinates of the 3 unfixed points.

Additionally, in another exemplary embodiment, the coordinates of a plurality of unfixed points may also be generated according to a predetermined rule. For example, the touch-sensitive device 170 divides the touch-sensitive display 160 into 9 blocks and stores the central point coordinates of the 9 blocks. Every time when the user interface 135 is switched to the user interface unlocking state, the touch-sensitive device 170 sequentially selects the central point coordinates as the coordinates of the unfixed points. It should be noted herein that the method and predetermined rule for randomly generating the coordinates of at least one unfixed point are not limited in the disclosure.

It should be understood that in the present exemplary embodiment, the number of unfixed points may be randomly determined or a fixed number. For example, the touch-sensitive device 170 randomly obtains a value smaller than a predetermined value as the number of the unfixed points or presets the number of the unfixed points to 3, 4, or another number.

Figure 9:
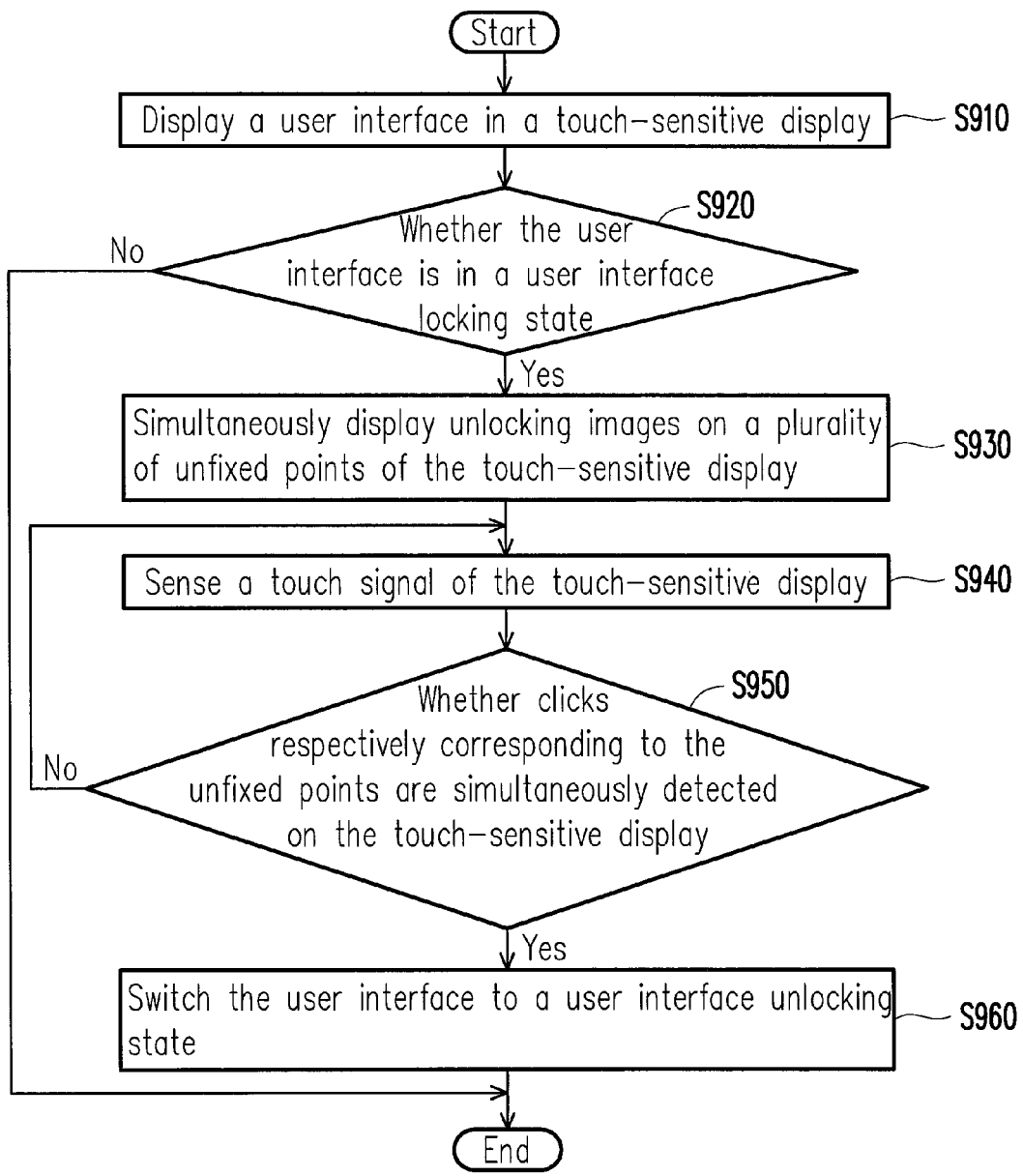
FIG. 9 is a flowchart of an unlocking method according to the second exemplary embodiment.

FIG. 9 is a flowchart of an unlocking method according to the second exemplary embodiment.

Referring to FIG. 9, in step S910, the touch-sensitive display 160 displays the user interface 135. In step S920, the touch-sensitive device 170 determines whether the user interface 135 is in the user interface locking state. If the user interface 135 is not in the user interface locking state, the procedure in FIG. 9 is terminated.

If the user interface 135 is in the user interface locking state, in step S930, the touch-sensitive device 170 drives the touch-sensitive display 160 to simultaneously display unlocking images on a plurality of unfixed points. For example, the user interface controlling unit 174 randomly generates the coordinates corresponding to a plurality of unfixed points, and the display driving unit 176 drives the touch-sensitive display 160 to simultaneously display unlocking images on the coordinates of the unfixed points. It should be mentioned that the unlocking images displayed on the unfixed points may be the same or different from each other.

In step S940, the touch-sensitive device 170 senses a touch signal of the touch-sensitive display 160. In step S950, the touch-sensitive device 170 determines whether clicks respectively corresponding to the unfixed points are simultaneously detected on the touch-sensitive display 160. If clicks respectively corresponding to the unfixed points are simultaneously detected on the touch-sensitive display 160, in step S960, the touch-sensitive device 170 switches the user interface 135 to the user interface unlocking state. If clicks respectively corresponding to the unfixed points are not simultaneously detected on the touch-sensitive display 160, step S940 is executed.

Third Exemplary Embodiment

The hardware structure in the third exemplary embodiment is substantially the same as that in the second exemplary embodiment, and the difference is that in the third exemplary embodiment, unlocking images are simultaneously displayed at a plurality of fixed positions on the touch-sensitive display, and the user interface is only switched to the user interface unlocking state when clicks corresponding to these fixed positions are simultaneously detected. Below, the unlocking method in the third exemplary embodiment will be described by referring to the devices described in the first exemplary embodiment.

In the present exemplary embodiment, the touch-sensitive device 170 stores a plurality of coordinate data in advance, and every time when the state of the user interface 135 is switched to the user interface locking state, the touch-sensitive device 170 simultaneously displays unlocking images at fixed positions on the touch-sensitive display 160 according to the coordinate data.

Figure 10:
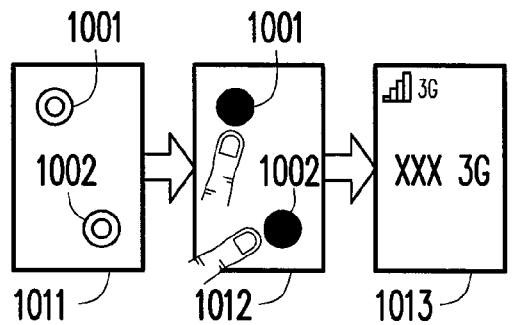
FIG. 10 and FIG. 11 are diagrams illustrating an example of how a user unlocks a user interface according to a third exemplary embodiment.
Figure 11:
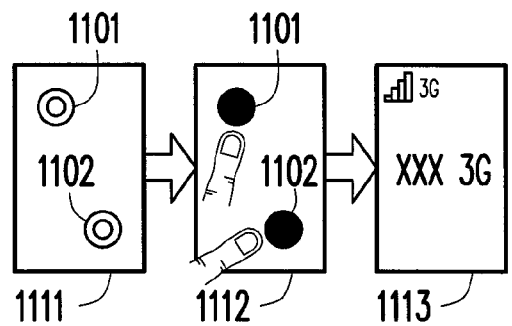

FIG. 10 and FIG. 11 are diagrams illustrating an example of how a user unlocks a user interface according to the third exemplary embodiment.

Referring to FIG. 10, when the user interface 135 is in the user interface locking state, the touch-sensitive device 170 drives the touch-sensitive display 160 to display unlocking images 1001 and 1002 at two fixed positions (Screen 1011). If the user is about to switch the user interface 135 to the user interface unlocking state, the user needs to click the unlocking images 1001 and 1002 at the same time.

After the user clicks the unlocking images 1001 and 1002 at the same time (Screen 1012), the touch-sensitive device 170 (or the user interface controlling unit 174) switches the user interface 135 to the user interface unlocking state (Screen 1013).

Referring to FIG. 11, when the user interface 135 is switched to the user interface locking state again, the touch-sensitive device 170 drives the touch-sensitive display 160 to display unlocking images 1101 and 1102 at the same two fixed positions (Screen 1111). After the user clicks the unlocking images 1101 and 1102 at the same time (Screen 1112), the touch-sensitive device 170 switches the user interface 135 to the user interface unlocking state (Screen 1113).

Figure 12:
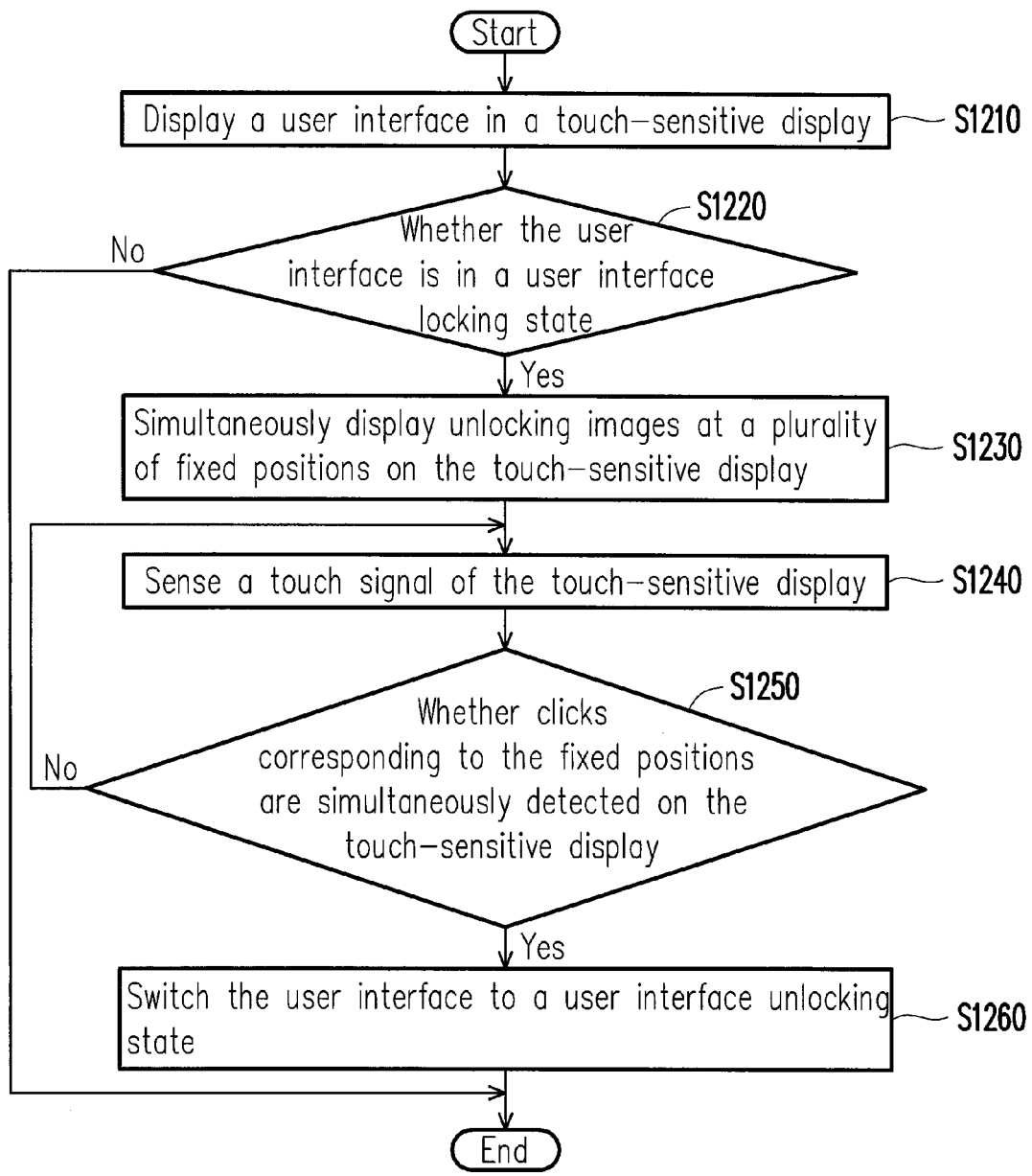
FIG. 12 is a flowchart of an unlocking method according to the third exemplary embodiment.

FIG. 12 is a flowchart of an unlocking method according to the third exemplary embodiment.

Referring to FIG. 12, in step S1210, the touch-sensitive display 160 displays the user interface 135. In step S1220, the touch-sensitive device 170 determines whether the user interface 135 is in the user interface locking state. If the user interface 135 is not in the user interface locking state, the procedure illustrated in FIG. 12 is terminated.

If the user interface 135 is in the user interface locking state, in step S1230, the touch-sensitive device 170 drives the touch-sensitive display 160 to simultaneously display unlocking images at a plurality of fixed positions. It should be mentioned that the unlocking images displayed at the fixed positions may be the same or different from each other.

In step S1240, the touch-sensitive device 170 senses a touch signal of the touch-sensitive display 160. In step S1250, the touch-sensitive device 170 determines whether clicks corresponding to these fixed positions are simultaneously detected on the touch-sensitive display 160. If clicks corresponding to these fixed positions are simultaneously detected on the touch-sensitive display 160, in step S1260, the touch-sensitive device 170 switches the user interface 135 to the user interface unlocking state. If clicks corresponding to these fixed positions are not simultaneously detected on the touch-sensitive display 160, step S1240 is executed.

Fourth Exemplary Embodiment

The hardware structure in the fourth exemplary embodiment is substantially the same as that in the second exemplary embodiment, and the difference is that in the fourth exemplary embodiment, unlocking images are simultaneously displayed on a plurality of unfixed point of the touch-sensitive display, and the user interface is only switched to the user interface unlocking state when clicks corresponding to these unfixed points are respectively detected. For example, in an exemplary embodiment, the user interface is only switched to the user interface unlocking state when clicks corresponding to the unfixed points are respectively detected in a predetermined sequence (for example, the user has to click a first unlocking image first and then a second unlocking image). Or, in another exemplary embodiment, the sequence for clicking the unlocking images is not limited, and the user interface is switched to the user interface unlocking state as long as the clicks corresponding to the unfixed points are detected (for example, the user can click the first unlocking image and then the second unlocking image or the second unlocking image and then the first unlocking image). Below, the unlocking method in the fourth exemplary embodiment will be described by referring to the devices described in the first exemplary embodiment.

Figure 13:
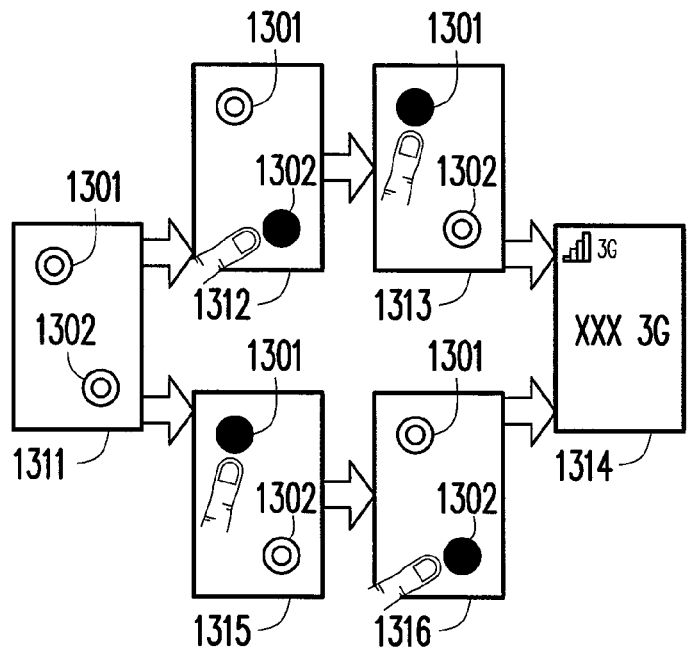
FIG. 13 and FIG. 14 are diagrams illustrating an example of how a user unlocks a user interface according to a fourth exemplary embodiment.
Figure 14:
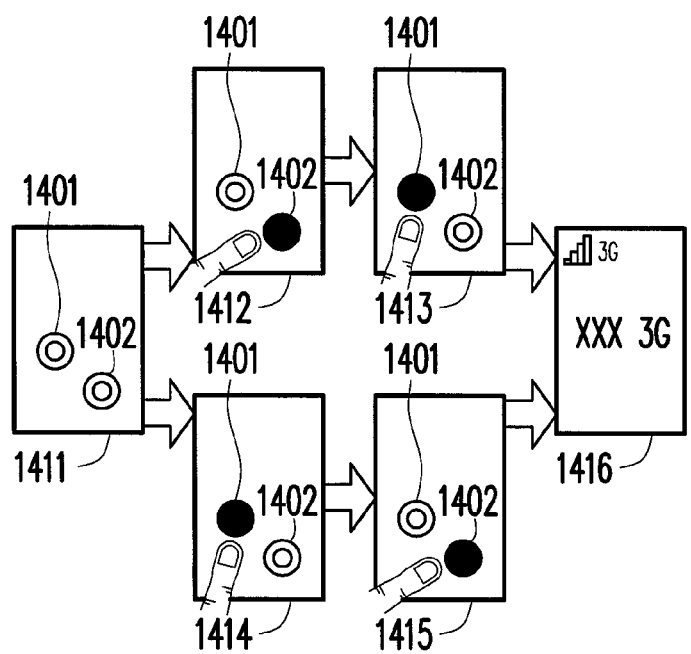

FIG. 13 and FIG. 14 are diagrams illustrating an example of how a user unlocks a user interface according to the fourth exemplary embodiment.

Referring to FIG. 13, when the user interface 135 is in the user interface locking state, the touch-sensitive device 170 drives the touch-sensitive display 160 to simultaneously display the unlocking images 1301 and 1302 on two unfixed points (Screen 1311). If the user is about to switch the user interface 135 to the user interface unlocking state, the user needs to respectively click the unlocking images 1301 and 1302.

For example, after the user first clicks the unlocking image 1302 (Screen 1312) and then clicks the unlocking image 1301 (Screen 1313), the touch-sensitive device 170 (or the user interface controlling unit 174) switches the user interface 135 to the user interface unlocking state (Screen 1314). Similarly, if the user first clicks the unlocking image 1301 (Screen 1315) and then the unlocking image 1302 (Screen 1316), the touch-sensitive device 170 also switches the user interface 135 to the user interface unlocking state (Screen 1314).

Referring to FIG. 14, when the user interface 135 is switched to the user interface locking state again after the unlocking procedure described above, the touch-sensitive device 170 drives the touch-sensitive display 160 to respectively display unlocking images 1401 and 1402 on two unfixed points (Screen 1411). Similarly, after the user clicks the unlocking image 1401 (or the unlocking image 1402) (corresponding to Screen 1412 or 1414) and then clicks the unlocking image 1402 (or the unlocking image 1401) (corresponding to the Screen 1413 or 1415), the touch-sensitive device 170 switches the user interface 135 to the user interface unlocking state (Screen 1416).

Figure 15:
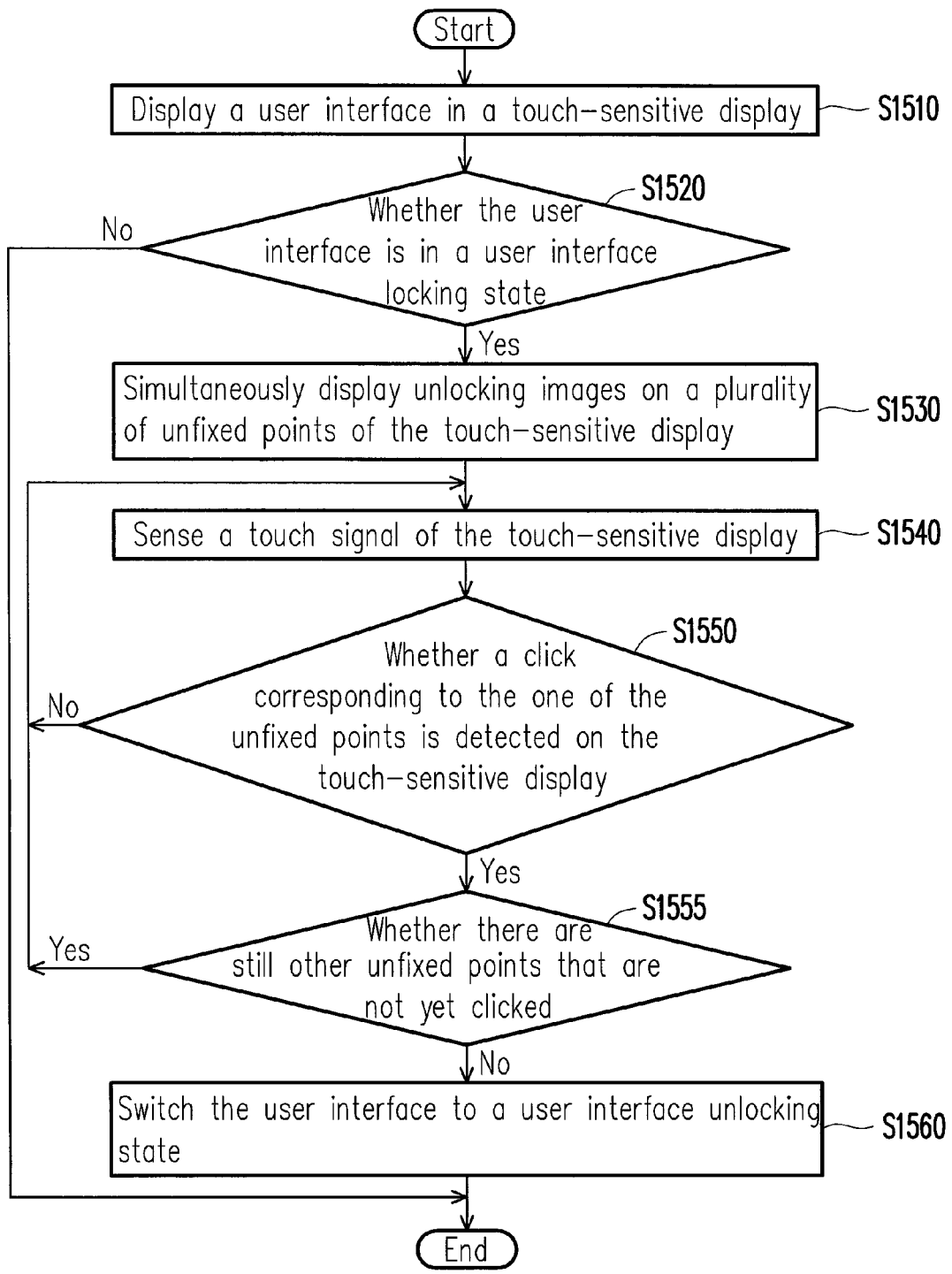
FIG. 15 is a flowchart of an unlocking method according to the fourth exemplary embodiment.

FIG. 15 is a flowchart of an unlocking method according to the fourth exemplary embodiment.

Referring to FIG. 15, in step S1510, the touch-sensitive display 160 displays the user interface 135. In step S1520, the touch-sensitive device 170 determines whether the user interface 135 is in the user interface locking state. If the user interface 135 is not in the user interface locking state, the procedure illustrated in FIG. 15 is terminated.

If the user interface 135 is in the user interface locking state, in step S1530, the touch-sensitive device 170 drives the touch-sensitive display 160 to simultaneously display the unlocking images on a plurality of unfixed points. It should be mentioned that the unlocking images displayed on the unfixed points may be the same or different from each other.

In step S1540, the touch-sensitive device 170 senses a touch signal of the touch-sensitive display 160. In step S1550, the touch-sensitive device 170 determines whether a click corresponding to one of the unfixed points is detected on the touch-sensitive display 160. If no click corresponding to one of the unfixed points is detected on the touch-sensitive display 160, step S1540 is executed again. If a click corresponding to one of the unfixed points is detected on the touch-sensitive display 160, in step S1555, the touch-sensitive device 170 determines whether there is still any other unfixed point that is not clicked. If there are still other unfixed points that are not clicked, step S1540 is executed. If all the unfixed points have been clicked, in step S1560, the touch-sensitive device 170 switches the user interface 135 to the user interface unlocking state.

Fifth Exemplary Embodiment

The hardware structure in the fifth exemplary embodiment is substantially the same as that in the fourth exemplary embodiment, and the difference is that in the fifth exemplary embodiment, unlocking images are simultaneously displayed at a plurality of fixed positions on the touch-sensitive display, and the user interface is only switched to the user interface unlocking state when clicks corresponding to these fixed positions are respectively detected. For example, in an exemplary embodiment, the user interface is only switched to the user interface unlocking state when clicks corresponding to the unfixed points are respectively detected in a predetermined sequence (for example, the user has to click a first unlocking image and then a second unlocking image). Or, in another exemplary embodiment, the sequence for clicking the unlocking images is not limited, and the user interface is switched to the user interface unlocking state as along as clicks corresponding to the unfixed points are detected (for example, the user first clicks the first unlocking image and then the second unlocking image, or the user first clicks the second unlocking image and then the first unlocking image). Below, the unlocking method in the fifth exemplary embodiment will be described by referring to the devices described in the first exemplary embodiment.

Figure 16:
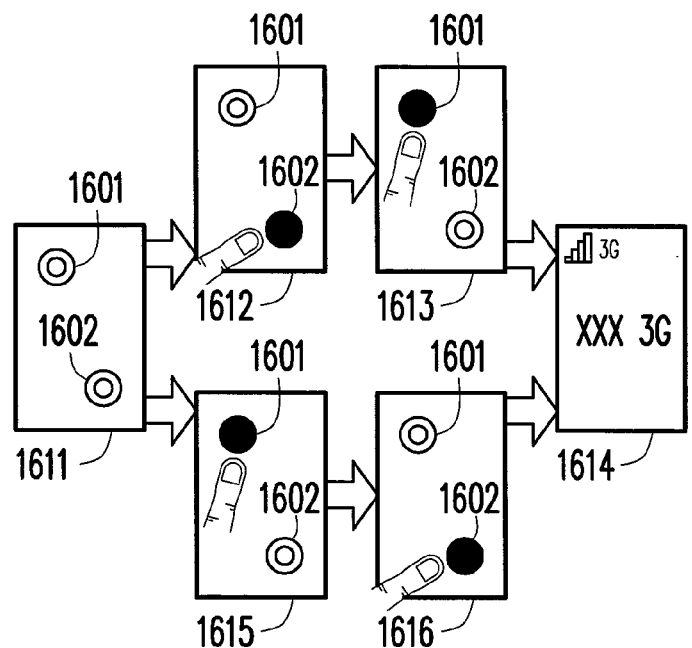
FIG. 16 and FIG. 17 are diagrams illustrating an example of how a user unlocks a user interface according to a fifth exemplary embodiment.
Figure 17:
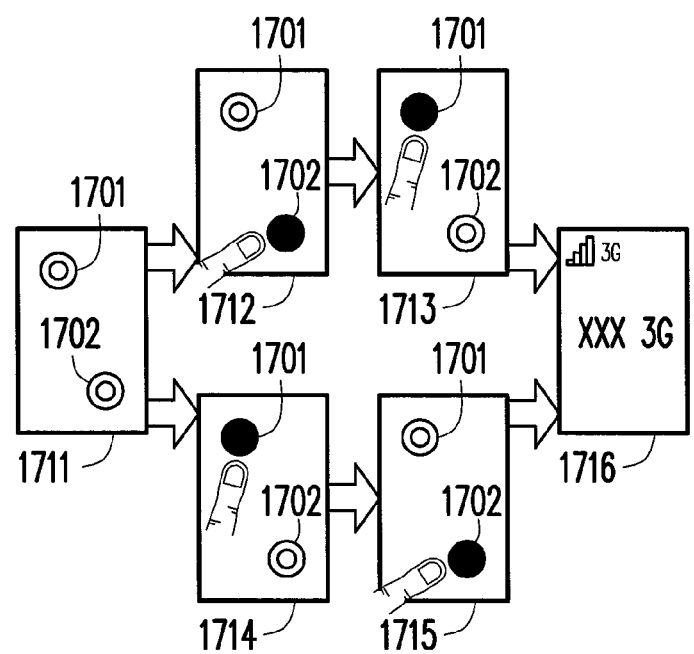

FIG. 16 and FIG. 17 are diagrams illustrating an example of how a user unlocks a user interface according to the fifth exemplary embodiment.

Referring to FIG. 16, when the user interface 135 is in the user interface locking state, the touch-sensitive device 170 drives the touch-sensitive display 160 to simultaneously display unlocking images 1601 and 1602 at two fixed positions (Screen 1611). Herein if the user is about to switch the user interface 135 to the user interface unlocking state, the user needs to respectively click the unlocking images 1601 and 1602.

For example, after the user first clicks the unlocking image 1602 (Screen 1612) and then clicks the unlocking image 1601 (Screen 1613), the touch-sensitive device 170 (or the user interface controlling unit 174) switches the user interface 135 to the user interface unlocking state (Screen 1614). Similarly, after the user first clicks the unlocking image 1601 (Screen 1615) and then clicks the unlocking image 1602 (Screen 1616), the touch-sensitive device 170 also switches the user interface 135 to the user interface unlocking state (Screen 1614).

Referring to FIG. 17, when the user interface 135 is switched to the user interface locking state again after the unlocking procedure described above, the touch-sensitive device 170 drives the touch-sensitive display 160 to respectively display unlocking images 1701 and 1702 at the same two fixed positions (Screen 1711). Similarly, after the user first clicks the unlocking image 1701 (or the unlocking image 1702) (corresponding to Screen 1712 or 1714) and then clicks the unlocking image 1702 (or the unlocking image 1701) (corresponding to Screen 1713 or 1715), the touch-sensitive device 170 switches the user interface 135 to the user interface unlocking state (Screen 1716).

Figure 18:
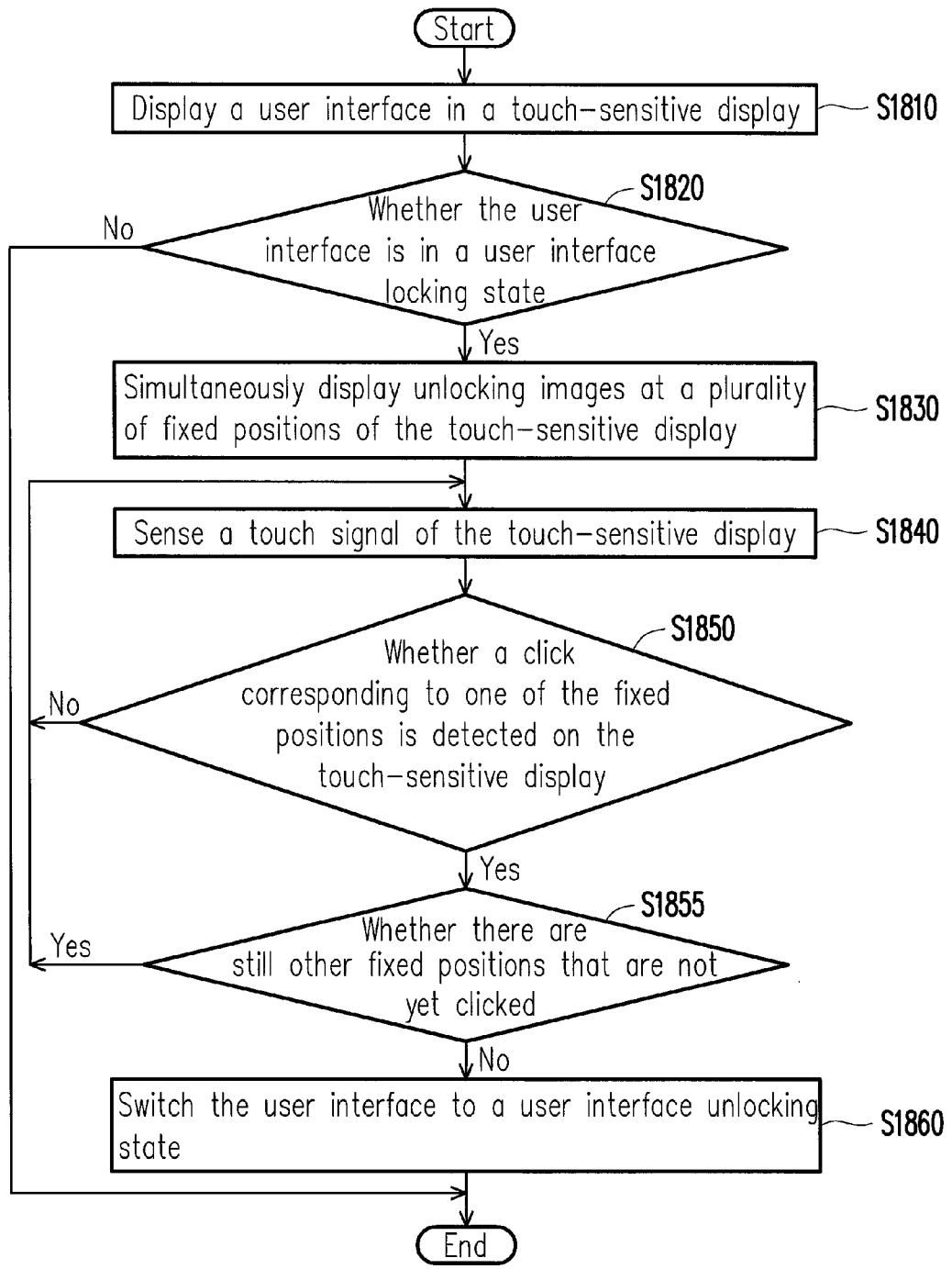
FIG. 18 is a flowchart of an unlocking method according to the fifth exemplary embodiment.

FIG. 18 is a flowchart of an unlocking method according to the fifth exemplary embodiment.

Referring to FIG. 18, in step S1810, the touch-sensitive display 160 displays the user interface 135. In step S1820, the touch-sensitive device 170 determines whether the user interface 135 is in the user interface locking state. If the user interface 135 is not in the user interface locking state, the procedure illustrated in FIG. 18 is terminated.

If the user interface 135 is in the user interface locking state, in step S1830, the touch-sensitive device 170 drives the touch-sensitive display 160 to simultaneously display unlocking images at a plurality of fixed positions. It should be mentioned that the unlocking images displayed at the fixed positions may be the same or different from each other.

In step S1840, the touch-sensitive device 170 senses a touch signal of the touch-sensitive display 160. In step S1850, the touch-sensitive device 170 determines whether a click corresponding to one of the fixed positions is detected on the touch-sensitive display 160. If no click corresponding to one of the fixed positions is detected on the touch-sensitive display 160, step S1840 is executed again. If a click corresponding to one of the fixed positions is detected on the touch-sensitive display 160, in step S1855, the touch-sensitive device 170 determines whether there is still any other fixed position that is not clicked. If there are still other fixed positions that are not clicked, step S1840 is executed. If all the fixed positions have been clicked, in step S1860, the touch-sensitive device 170 switches the user interface 135 to the user interface unlocking state.

Sixth Exemplary Embodiment

The hardware structure in the sixth exemplary embodiment is substantially the same as that in the fourth exemplary embodiment, and the difference is that in the sixth exemplary embodiment, a plurality of unlocking images is sequentially displayed on a plurality of unfixed points of the touch-sensitive display, and the user interface is only switched to the user interface unlocking state when clicks corresponding to these unfixed points are sequentially or simultaneously detected. Below, the unlocking method in the sixth exemplary embodiment will be described by referring to the devices described in the first exemplary embodiment.

Figure 19:
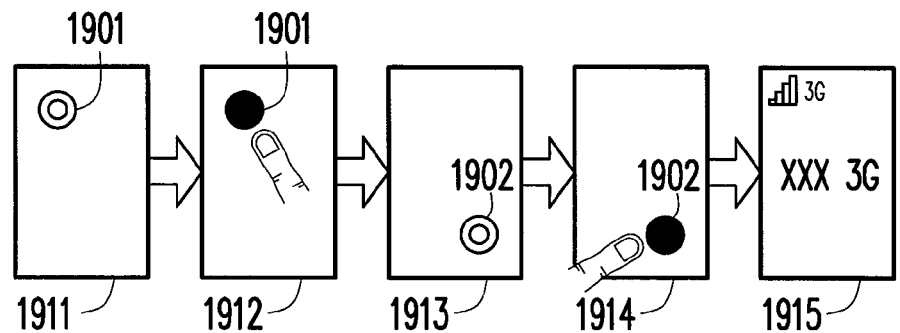
FIG. 19 and FIG. 20 are diagrams illustrating an example of how a user unlocks a user interface according to a sixth exemplary embodiment.
Figure 20:
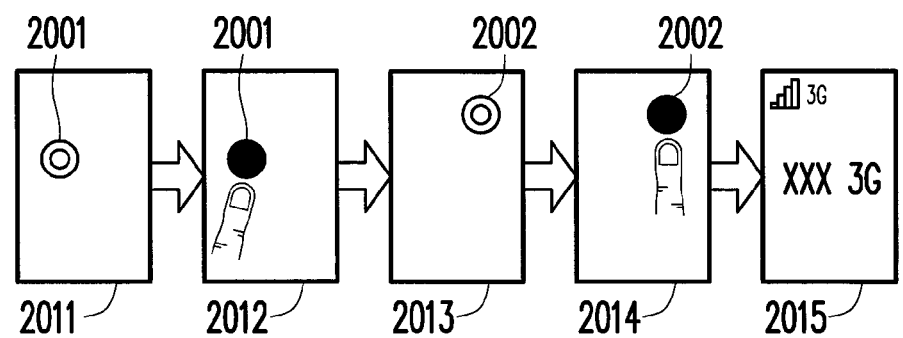

FIG. 19 and FIG. 20 are diagrams illustrating an example of how a user unlocks a user interface according to the sixth exemplary embodiment.

Referring to FIG. 19, when the user interface 135 is in the user interface locking state, the touch-sensitive device 170 first drives the touch-sensitive display 160 to display an unlocking image 1901 on a randomly determined unfixed point (Screen 1911). Subsequently, when the user clicks the unlocking image 1901 (Screen 1912), the touch-sensitive device 170 removes the unlocking image 1901 from the touch-sensitive display 160 and drives the touch-sensitive display 160 to display an unlocking image 1902 on another randomly determined unfixed point (Screen 1913). After the user clicks the unlocking image 1902 (Screen 1914), the touch-sensitive device 170 (or the user interface controlling unit 174) switches the user interface 135 to the user interface unlocking state (Screen 1915).

Referring to FIG. 20, when the user interface 135 is switched to the user interface locking state again after the unlocking procedure described above, similarly, the touch-sensitive device 170 drives the touch-sensitive display 160 to display an unlocking image 2001 on a randomly determined unfixed point (Screen 2011). Subsequently, when the user clicks the unlocking image 2001 (Screen 2012), the touch-sensitive device 170 removes the unlocking image 2001 from the touch-sensitive display 160 and drives the touch-sensitive display 160 to display an unlocking image 2002 on another randomly determined unfixed point (Screen 2013). After the user clicks the unlocking image 2002 (Screen 2014), the touch-sensitive device 170 switches the user interface 135 to the user interface unlocking state (Screen 2015).

It has to be understood that even though in the present exemplary embodiment, the user interface is only switched to the user interface unlocking state when the clicks corresponding to the unfixed points are sequentially detected, the disclosure is not limited thereto. For example, in another embodiment of the disclosure, the user interface is switched to the user interface unlocking state when the clicks corresponding to the unfixed points are simultaneously detected.

Figure 21:
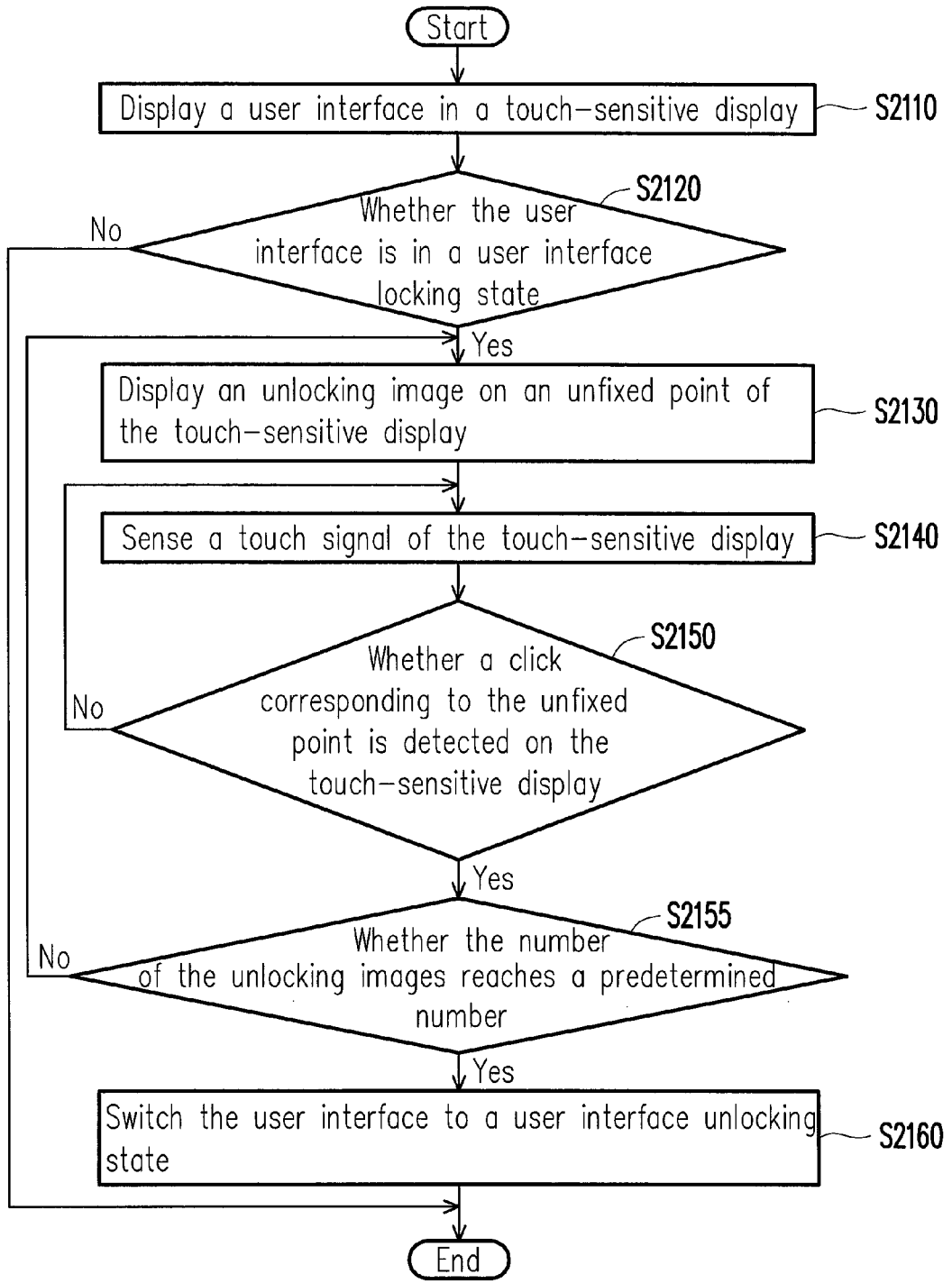
FIG. 21 is a flowchart of an unlocking method according to the sixth exemplary embodiment.

FIG. 21 is a flowchart of an unlocking method according to the sixth exemplary embodiment.

Referring to FIG. 21, in step S2110, the touch-sensitive display 160 displays the user interface 135. In step S2120, the touch-sensitive device 170 determines whether the user interface 135 is in the user interface locking state. If the user interface 135 is not in the user interface locking state, the procedure illustrated in FIG. 21 is terminated.

If the user interface 135 is in the user interface locking state, in step S2130, the touch-sensitive device 170 drives the touch-sensitive display 160 to display an unlocking image on an unfixed point.

In step S2140, the touch-sensitive device 170 senses a touch signal of the touch-sensitive display 160. In step S2150, the touch-sensitive device 170 determines whether a click corresponding to the unfixed point is detected on the touch-sensitive display 160. If no click corresponding to the unfixed point is detected on the touch-sensitive display 160, step S2140 is executed. If a click corresponding to the unfixed point is detected on the touch-sensitive display 160, in step S2155, the touch-sensitive device 170 determines whether the number of displayed unlocking images reaches a predetermined number. For example, in the example illustrated in FIG. 19 and FIG. 20, the predetermined number is 2. However, the disclosure is not limited thereto.

If the number of the displayed unlocking image has not reached the predetermined number, step S2130 is executed. If the number of the displayed unlocking images reaches the predetermined number, in step S2160, the touch-sensitive device 170 switches the user interface 135 to the user interface unlocking state.

Seventh Exemplary Embodiment

The hardware structure in the seventh exemplary embodiment is substantially the same as that in the sixth exemplary embodiment, and the difference is that in the seventh exemplary embodiment, a plurality of unlocking images is sequentially displayed at a plurality of fixed positions of the touch-sensitive display, and the user interface is only switched to the user interface unlocking state when clicks corresponding to these fixed positions are sequentially or simultaneously detected. Below, the unlocking method in the seventh exemplary embodiment will be described by referring to the devices described in the first exemplary embodiment.

Figure 22:
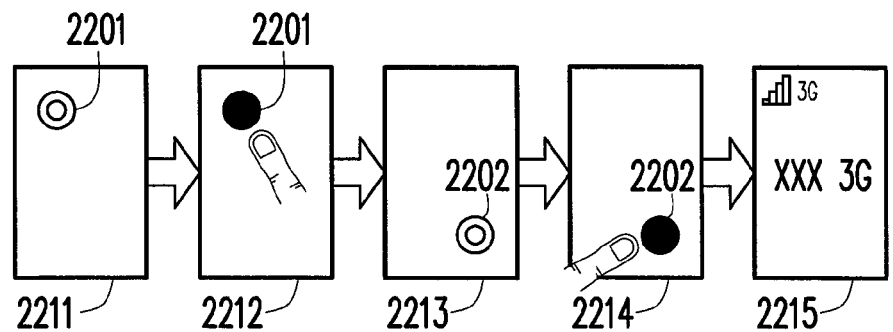
FIG. 22 and FIG. 23 are diagrams illustrating an example of how a user unlocks a user interface according to a seventh exemplary embodiment.
Figure 23:
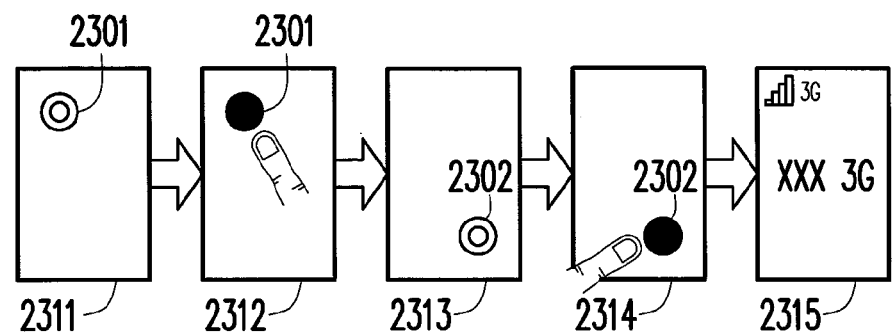

FIG. 22 and FIG. 23 are diagrams illustrating an example of how a user unlocks a user interface according to the seventh exemplary embodiment.

Referring to FIG. 22, when the user interface 135 is in the user interface locking state, the touch-sensitive device 170 first drives the touch-sensitive display 160 to display an unlocking image 2201 at a first fixed position (Screen 2211). Subsequently, when the user clicks the unlocking image 2201 (Screen 2212), the touch-sensitive device 170 removes the unlocking image 2201 from the touch-sensitive display 160 and drives the touch-sensitive display 160 to display an unlocking image 2202 at a second fixed position (Screen 2213). After the user clicks the unlocking image 2202 (Screen 2214), the touch-sensitive device 170 (or the user interface controlling unit 174) switches the user interface 135 to the user interface unlocking state (Screen 2215).

Referring to FIG. 23, when the user interface 135 is switched to the user interface locking state again after the unlocking procedure described above, similarly, the touch-sensitive device 170 drives the touch-sensitive display 160 to display an unlocking image 2301 at the first fixed position (Screen 2311). Subsequently, when the user clicks the unlocking image 2301 (Screen 2312), the touch-sensitive device 170 removes the unlocking image 2301 from the touch-sensitive display 160 and drives the touch-sensitive display 160 to display an unlocking image 2302 at the second fixed position (Screen 2313). After the user clicks the unlocking image 2302 (Screen 2314), the touch-sensitive device 170 switches the user interface 135 to the user interface unlocking state (Screen 2315).

It should be understood that even though in the present exemplary embodiment, the user interface is only switched to the user interface unlocking state when the clicks corresponding to the fixed positions are sequentially detected, the disclosure is not limited thereto. For example, in another embodiment of the disclosure, the user interface is switched to the user interface unlocking state when the clicks corresponding to the fixed positions are simultaneously detected.

Figure 24:
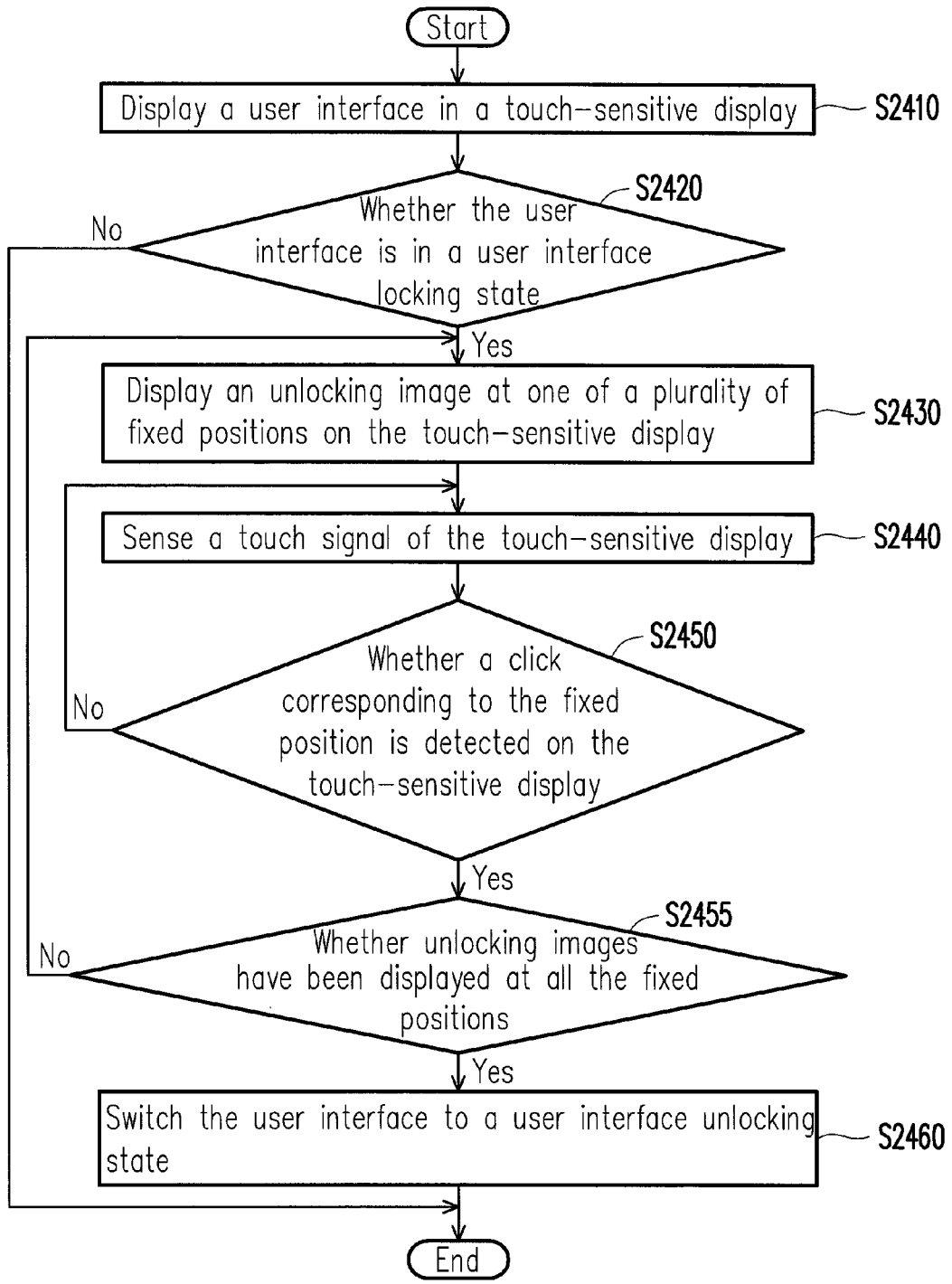
FIG. 24 is a flowchart of an unlocking method according to the seventh exemplary embodiment.

FIG. 24 is a flowchart of an unlocking method according to the seventh exemplary embodiment.

Referring to FIG. 24, in step S2410, the touch-sensitive display 160 displays the user interface 135. In step S2420, the touch-sensitive device 170 determines whether the user interface 135 is in the user interface locking state. If the user interface 135 is not in the user interface locking state, the procedure illustrated in FIG. 21 is terminated.

If the user interface 135 is in the user interface locking state, in step S2430, the touch-sensitive device 170 drives the touch-sensitive display 160 to display an unlocking image at one of a plurality of predetermined fixed positions. For example, in the example illustrated in FIG. 22 and FIG. 23, the number of the predetermined fixed positions is 2. However, the disclosure is not limited thereto.

In step S2440, the touch-sensitive device 170 senses a touch signal of the touch-sensitive display 160. In step S2450, the touch-sensitive device 170 determines whether a click corresponding to the fixed position is detected on the touch-sensitive display 160. If no click corresponding to the fixed position is detected on the touch-sensitive display 160, step S2440 is executed. If a click corresponding to the fixed position is detected on the touch-sensitive display 160, in step S2455, the touch-sensitive device 170 determines whether unlocking images have been displayed at all the fixed positions.

If there are still fixed positions at which no unlocking image is ever displayed, step S2430 is executed. If unlocking images have been displayed at all the fixed positions, in step S2460, the touch-sensitive device 170 switches the user interface 135 to the user interface unlocking state.

It should be mentioned that in the exemplary embodiments described above, an unlocking image is not limited to a figure (for example, a dot or a figure in any other shape). In another exemplary embodiment, the type of an unlocking image may be a system default setting or a user setting, or an unlocking image may also be presented as an animation, text, or a combination of an animation and text. Besides, an unlocking image may be generated randomly or according to a predetermined rule. In addition, when a plurality of unlocking images is sequentially or simultaneously generated, these unlocking images may be the same or different from each other. Moreover, the generation of unlocking images can be carried out with the playing of sound or music and/or with the variations in display speed and time, so as to meet the requirements of different applications. Furthermore, other functions may be further realized by displaying functional unlocking images or unlocking images indicating special meanings. For example, in some embodiments, different types of unlocking images are simultaneously or sequentially displayed, and the user interface is unlocked by determining whether a specific type of unlocking images are touched. Additionally, in some embodiments, not all the displayed unlocking images have to be clicked to unlock the user interface, and the user interface can be unlocked when a specific number of unlocking images are clicked. For example, the user interface is unlocked when P2 unlocking images among P1 unlocking images that are simultaneously or sequentially displayed on fixed points or unfixed points are clicked, wherein P2≤P1.

The embodiments described above can be combined with each other. For example, in an embodiment, unlocking images are sequentially displayed on unfixed points, but every time multiple unlocking images (instead of only one unlocking image) are simultaneously displayed. Besides, the relative position between the unlocking images simultaneously displayed every time may be fixed or unfixed. For example, only one of the unlocking images is displayed on a random or fixed point while the other unlocking images have fixed relative position. Or, the unlocking images simultaneously displayed every time are always displayed at random positions. Moreover, one or more of foregoing embodiments can be implemented according to user default settings or system default settings. In other words, one or more embodiments can be implemented in the same portable electronic device.

In another exemplary embodiment, the unlocking images displayed in the user interface are respectively corresponding to system states of the unlocked user interface. For example, when the user interface 135 is in the user interface locking state and a predetermined special event (for example, an incoming call is received), the touch-sensitive device 170 drives the touch-sensitive display 160 to display one or more functional unlocking images (for example, for answering or hanging up the call). When the user clicks one of the functional unlocking images, the touch-sensitive device 170 switches the user interface 135 to a functional figure corresponding to the clicked functional unlocking image. For example, when the user clicks the functional unlocking image corresponding to the function of answering the call, the touch-sensitive device 170 unlocks the user interface 135 and displays a system state corresponding to the function of answering the call. After the user finishes the function corresponding to the functional figure, the state of the user interface 135 of the touch-sensitive device 170 returns to the user interface locking state.

It has to be understood that the change of system state upon reception of an incoming call is only described herein as an example but not intended to limit the disclosure. For example, when a low battery prompt pops up in a touch-sensitive device due to insufficient battery power, a corresponding operation can be performed according to aforementioned one or more functional unlocking images. Other applications will not be described herein.

As described above, in an unlocking method, a portable electronic device, and a touch-sensitive device provided by the disclosure, a user interface is unlocked by detecting clicks corresponding to unlocking images displayed on at least one unfixed point or at a plurality of fixed positions. In addition, the number of the at least one unfixed point or the fixed positions may be a user setting, a system default setting, or a random number according to the design requirement (the number can be set to be within a specific range according to the design requirement). Thereby, the unlocking method, the portable electronic device, and the touch-sensitive device provided by the disclosure can effectively unlock the user interface.

It will be apparent to those skilled in the art that various modifications and variations can be made to the structure of the disclosure without departing from the scope or spirit of the disclosure. In view of the foregoing, it is intended that the disclosure cover modifications and variations of this invention provided they fall within the scope of the following claims and their equivalents.

What is claimed is:

1. An unlocking method for a portable electronic device, wherein the portable electronic device has a touch-sensitive display, and a user interface is displayed on the touch-sensitive display, the unlocking method comprising:
   when the user interface is in a first user interface locking state, respectively displaying at least one unlocking image on at least one point of the touch-sensitive display;
   sensing a touch signal of the touch-sensitive display; and
   when at least one click respectively corresponding to the at least one point is detected on the touch-sensitive display, switching the user interface to a user interface unlocking state;
   when the user interface is in a second user interface locking state, respectively displaying at least one another unlocking image on at least one another point of the touch-sensitive display; and
   when at least one click respectively corresponding to the at least one another point is detected on the touch-sensitive display, switching the user interface to the user interface unlocking state,
   wherein a number of the at least one point is different from a number of the at least one another point.

2. The unlocking method according to claim 1 further comprising generating coordinates of the at least one point when the user interface is switched to the second user interface locking state.

3. The unlocking method according to claim 1, wherein each one of the at least one click is a single click, a multiple-click, or a long-click.

4. The unlocking method according to claim 1, wherein when the number of the at least one point is 1, the at least one click is a multiple-click or a long-click, and when the number of the at least one point is greater than 1, each one of the at least one click is a single click, a multiple-click, or a long-click.

5. The unlocking method according to claim 1, wherein when the number of the at least one point is greater than 1, the step of respectively displaying the at least one unlocking image on the at least one point of the touch-sensitive display comprises respectively and simultaneously displaying the at least one unlocking image on the at least one point.

6. The unlocking method according to claim 5, wherein when the number of the at least one point is greater than 1, the step of switching the user interface to the user interface unlocking state when the at least one click respectively corresponding to the at least one point is detected on the touch-sensitive display comprises:
   when the at least one click respectively corresponding to the at least one point is simultaneously detected on the touch-sensitive display, switching the user interface to the user interface unlocking state.

7. The unlocking method according to claim 5, wherein when the number of the at least one point is greater than 1, the step of switching the user interface to the user interface unlocking state when the at least one click respectively corresponding to the at least one point is detected on the touch-sensitive display comprises:
   when the at least one click respectively corresponding to the at least one point is sequentially detected on the touch-sensitive display, switching the user interface to the user interface unlocking state.

8. The unlocking method according to claim 1, wherein when the number of the at least one point is greater than 1, the step of respectively displaying the at least one unlocking image on the at least one point of the touch-sensitive display comprises sequentially and respectively displaying the at least one unlocking image on the at least one point at different times.

9. The unlocking method according to claim 8, wherein when the number of the at least one point is greater than 1, the step of switching the user interface to the user interface unlocking state when the at least one click respectively corresponding to the at least one point is detected on the touch-sensitive display comprises:
   when the at least one click respectively corresponding to the at least one point is sequentially detected on the touch-sensitive display, switching the user interface to the user interface unlocking state.

10. The unlocking method according to claim 1, wherein when the number of the at least one point is greater than 1, the at least one unlocking image is different from each other.

11. The unlocking method according to claim 1, wherein the at least one point is corresponding to at least one coordinate, and each of the at least one coordinate is randomly generated.

12. The unlocking method according to claim 1, wherein the at least one point is corresponding to at least one coordinate, and each of the at least one coordinate is generated according to a predetermined rule.

13. A touch-sensitive device, comprising:
a user interface controlling unit, configured to control a user interface;
a display driving unit, configured to drive a touch-sensitive display to respectively display at least one unlocking image on at least one point when the user interface is in a first user interface locking state; and
a sensing unit, configured to sense a touch signal of the touch-sensitive display,
wherein when the sensing unit detects at least one click respectively corresponding to the at least one point on the touch-sensitive display, the user interface controlling unit switches the user interface to a user interface unlocking state,
wherein the display driving unit drives a touch-sensitive display to respectively display at least one another unlocking image on at least one another point when the user interface is in a second user interface locking state,
wherein when the sensing unit detects at least one click respectively corresponding to the at least one another point on the touch-sensitive display, the user interface controlling unit switches the user interface to the user interface unlocking state,
wherein a number of the at least one point is different from a number of the at least one another point.

14. A portable electronic device, comprising:
a touch-sensitive display, configured to display a user interface; and
a touch-sensitive device, comprising:
a user interface controlling unit, configured to control a user interface;
a display driving unit, configured to drive a touch-sensitive display to respectively display at least one unlocking image on at least one point when the user interface is in a first user interface locking state; and
a sensing unit, configured to sense a touch signal of the touch-sensitive display,
wherein when the sensing unit detects at least one click respectively corresponding to the at least one point on the touch-sensitive display, the user interface controlling unit switches the user interface to a user interface unlocking state,
wherein the display driving unit drives a touch-sensitive display to respectively display at least one another unlocking image on at least one another point when the user interface is in a second user interface locking state,
wherein when the sensing unit detects at least one click respectively corresponding to the at least one another point on the touch-sensitive display, the user interface controlling unit switches the user interface to the user interface unlocking state,
wherein a number of the at least one point is different from a number of the at least one another point.

* * * * *